No. 753,660. PATENTED MAR. 1, 1904.
G. W. BOYER.
EAVES TROUGH CLEANER.
APPLICATION FILED AUG. 10, 1903.
NO MODEL.
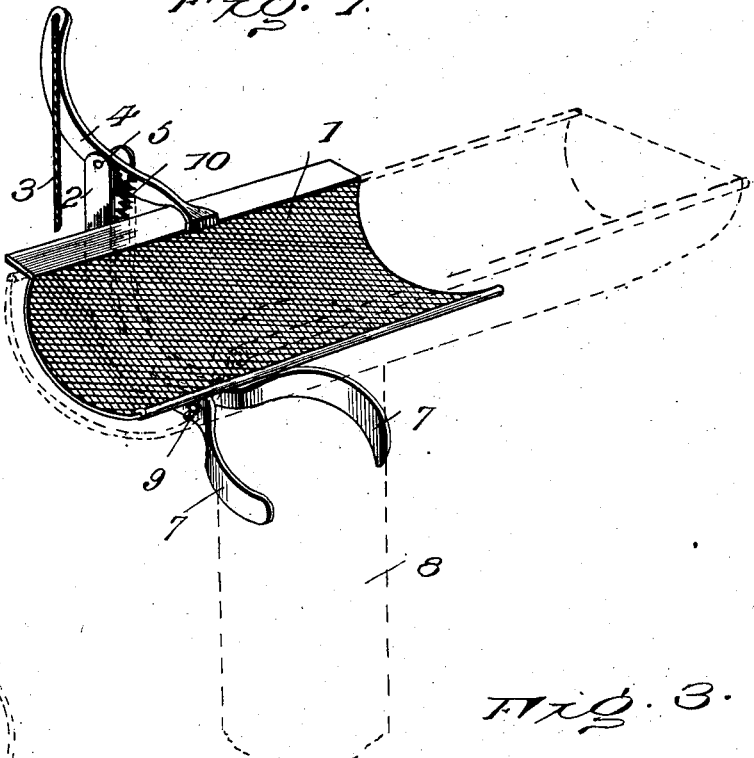
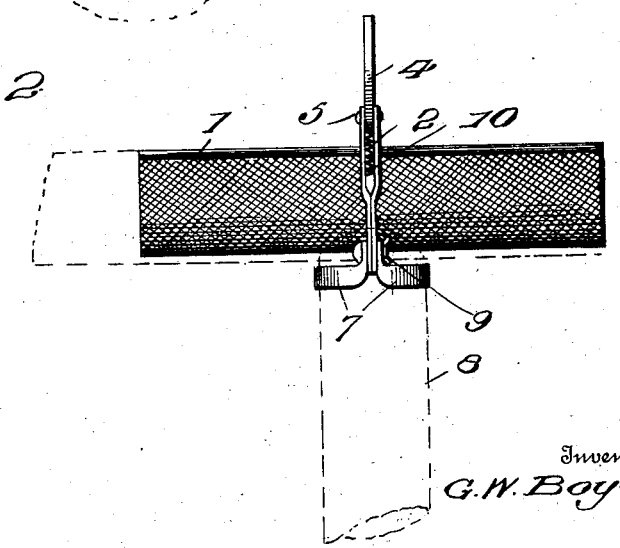
Witnesses
J. W. Wheeler.
Inventor
G. W. Boyer
By Lacey, Attorneys No. 753,660. Patented March 1, 1904.

UNITED STATES PATENT OFFICE.

GEORGE W. BOYER, OF DESOTO, MISSOURI.

EAVES-TROUGH CLEANER.

SPECIFICATION forming part of Letters Patent No. 753,660, dated March 1, 1904.

Application filed August 10, 1903. Serial No. 168,973. (No model.)

*To all whom it may concern:*

Be it known that I, GEORGE W. BOYER, a citizen of the United States, residing at Desoto, in the county of Jefferson and State of Missouri, have invented certain new and useful Improvements in Eaves-Trough Cleaners, of which the following is a specification.

This invention provides a peculiar form of cleaner device preferably adapted for use upon eaves-troughs, though applicable in its cleaner capacity to other structures where it might be used to advantage.

The cleaner comprises a pivoted trap disposed adjacent the drainage-pipe and a peculiar form of support for the pivoted trap.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of the cleaner device applied to eaves-troughs, showing the recurved portions of the members 7 extended, so as to better illustrate the exact construction thereof. Fig. 2 is a side elevation. Fig. 3 is a rear elevation.

Corresponding and like parts are referred to in the following description and indicated in all the views of the drawings by the same reference characters.

As before mentioned, the cleaner consists of a trap 1, pivoted to a support 2, and is adapted to be operated so as to throw any foreign matter which may lodge thereon from the trough upon operation by means of a pull-cord 3. The trap 1 consists of a woven screen upon a frame, and a lever 4 is projected from the said trap and is operated by the pull-cord 3, before described. The trap is pivotally disposed, the lower portion of the lever 4 being received by the support 2 and secured thereto by means of a pivot-fastening 5. The support 2 comprises corresponding side members 6, which members are provided at their lower end with recurved portions 7, which embrace the body of the drainage-pipe, (shown in dotted lines,) which is designated 8. The members 6 of the support 2 are secured together by means of a removable fastening 9, and for this reason the support is adapted to be applied to different-size drainage-pipes particularly or other parts to which the device may be applied. The pivot-fastening 5 is located upon the upper extremity of the support 2, and approximate the point of pivotal connection is a spring 10, which spring serves to normally hold the trap above the drainage-pipe opening and to return the trap to such position after the same has been operated by pulling down upon the lever.

Having thus described the invention, what is claimed as new is—

1. A cleaner for eaves-troughs and the like comprising a removable support, a trap pivoted to the support, a lever projected from the trap for operation thereof and spring means for normally holding the trap in an ascertained position.

2. A cleaner for eaves-troughs and the like comprising a support consisting of corresponding side members, provided with attaching members, a trap pivoted intermediate the aforesaid side members of the support, and a lever projected from the trap for operation thereof.

3. A cleaner for eaves-troughs and the like comprising a support consisting of corresponding side members having recurved end portions for attachment of the support, means for removably securing the side members together, a trap, a lever projected from the trap and received between the aforesaid side members and pivoted thereto, operating means connected to the lever for operation thereof to tilt the trap, and spring means for holding the trap in an ascertained position.

In testimony whereof I affix my signature in presence of two witnesses.

GEORGE × W. BOYER. [L. S.]
his   mark

Witnesses:
C. C. WALDO,
C. MILLER.